(12) United States Patent
Zink et al.

(10) Patent No.: US 8,061,327 B2
(45) Date of Patent: Nov. 22, 2011

(54) TANGENTIAL COMBUSTION TURBINE

(76) Inventors: Alexander M. Zink, Ried (DE);
Alexander S. Zink, Ried (DE); Michael M. Zink, Ried (DE)

(*) Notice: Subject to any disclaimer, the term of this patent is extended or adjusted under 35 U.S.C. 154(b) by 203 days.

(21) Appl. No.: 12/498,794

(22) Filed: Jul. 7, 2009

(65) Prior Publication Data

US 2009/0272094 A1 Nov. 5, 2009

(30) Foreign Application Priority Data

Apr. 17, 2008 (DE) .......................... 10 2008 019 262
Oct. 1, 2008 (DE) .......................... 10 2008 050 014

(51) Int. Cl.
*F02B 53/00* (2006.01)
(52) U.S. Cl. ...................................... 123/244; 123/241
(58) Field of Classification Search .................. 123/241, 123/244, 248; 418/243, 266, 248, 267, 268, 418/249
See application file for complete search history.

(56) References Cited

U.S. PATENT DOCUMENTS

| | | | | | |
|---|---|---|---|---|---|
| 1,145,161 | A | * | 7/1915 | Mears | 123/248 |
| 1,242,693 | A | * | 10/1917 | Hibner | 123/248 |
| 3,913,534 | A | * | 10/1975 | Bratten | 123/248 |
| 3,978,825 | A | * | 9/1976 | Rogers | 123/244 |
| 4,009,690 | A | * | 3/1977 | Moran | 123/244 |
| 4,860,704 | A | * | 8/1989 | Slaughter | 123/237 |
| 6,062,188 | A | * | 5/2000 | Okamura | 123/228 |
| 7,845,332 | B2 | * | 12/2010 | Wang | 123/241 |
| 2005/0193975 | A1 | * | 9/2005 | Kim | 123/241 |
| 2008/0190395 | A1 | * | 8/2008 | Rom et al. | 123/241 |
| 2009/0114184 | A1 | * | 5/2009 | Wang | 123/208 |

* cited by examiner

Primary Examiner — Thomas Denion
Assistant Examiner — Mary A Davis (57) ABSTRACT

A tangential combustion turbine is disclosed which is based on a casing, a rotor, and moving levers. A radial compressor is attached to the rotor and creates air pressure which pushes air into the combustion chamber based on the position and design of the combustion lever. The combustion chamber is defined by spaces between rotor lobes, and by combustion levers and exhaust levers which follow the rotor surface. A premix fuel system or direct fuel injection is used to create combustion. The exhaust gases then pass through the exhaust lever into the exhaust piping as the rotor rotates.

7 Claims, 12 Drawing Sheets

TANGENTIAL COMBUSTION TURBINE

CROSS REFERENCE TO RELATED APPLICATIONS

This application claims the benefit of German Application No. DE 10 2008 050 014.3 filed on Nov. 1, 2008, now German Patent No DE 10 2008 050 014, which claims the benefit of German Application No. DE 10 2008 019 262.7, filed on Apr. 17, 2008, now abandoned.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION (1) Field of the Invention

This application is directed to a rotational combustion turbine or engine, with a stationary casing and a rotating part, in which the thermodynamic expansion power released during the burning of an oxygen/combustible mixture of fuel within defined chambers, works directly against a rotor, and is directly transformed into mechanical power.

(2) Description of Related Art

The classical Otto, Diesel, and Wankel engines, with the first two having a development history of more than 100 years, have meanwhile reached very high performances, but are still less than ideal regarding the modern requirements for more economic, environmental friendlier as well as for higher performance engines. Some of the main disadvantages of these engines are the occurring of the ignition only after two or four revolutions, high vibrations, two dead rotation points in the power transmission from piston to the crank shaft, many heavy oscillating and rotating parts to be balanced etc. The vibrations and sealing problems of the Wankel engine have not been solved yet.

Most of the rotational engines are based on the Wankel design, or have pulsating piston systems within circular trajectories and need complicated gears for the conversion of the chemical energy into mechanical power, and thus deliver low efficiency. Some of these engines with more tangential action of the ignition do have large pendulant components and shapes that are difficult to seal. These engines provide a reduced number of ignitions per rotation and have relatively low compression rates, what makes them economically obsolete. The well known Gas Turbines are ideal for the airplane industry, especially for high speed and high performances, but are not economical for slower and smaller means of transportation.

Others have worked on rotary engines. A common design is the rotary vane type, of which, U.S. Pat. No. 2,468,451 is an example. There are always reliability issues with the rotary vanes in a rotating engine. The structure to house the vanes and allow them to move becomes complicated and requires a robust setup to allow reliable, consistent operation. The vanes must be designed with the exhaust and intake systems in mind to ensure the seals are not affected by any valves or chamber openings. The reliability of the gas sealing and the movement of the vanes is always questionable. In a rotating engine it is much more desirable to have a sealing system that follows a smooth surface to ensure reliable operation.

U.S. Pat. No. 2,988,008 describes the Wankel rotary type of rotary engine which is known in the art. Fundamentally, it is a four stroke cycle is carried out in three or four working chambers. The seal between the inner rotor and outer rotor is always a complicated matter due to the geometry match of the rotating member to the stationary casing. This type of engine has not been widely implemented due to problems of sealing within combustion chamber, poor durability, low fuel efficiency at low loads, and undesirable emissions.

BRIEF SUMMARY OF THE INVENTION

The invention refers to a rotational combustion engine with a stationary casing and a rotating part, the Rotor, in which the thermodynamic expansion power released during the burning of an oxygen/combustible mixture within chambers, works directly against a rotor, therefore being transformed without intermediary into mechanical energy.

DETAILED DESCRIPTION OF THE INVENTION

The present invention permits the construction of very compact engines with less moving parts, and the components are relatively simple and easy to manufacture. The present invention is a Tangential Combustion Turbine, and may also be called the Zink's Engine, and offers the advantage of a cleaner and more controllable combustion which results in better efficiency compared to the classical engines. This favors the use of this Tangential Combustion Turbine for the auto and airplane industry, as well as the generation of electrical power.

The present invention creates an engine which combines the principle of the internal combustion engines of Otto and Diesel (based on the Carnot Cycle) with the function and efficiency of the jet engines (based on the Brayton Cycle) in order to employ the combination of their best parameters. The present invention implements a hybrid Carnot-Brayton cycle in an intermittent manner and at much lower RPM rates compared with the gas turbines. Furthermore, the present invention achieves a substantial reduction of the number of moving parts compared with the Otto/Diesel engines, as well as the constructive simplification of their parts. The present invention provides better fuel efficiency, is relatively vibration free, and achieves a substantial increase in power per unit of weight compared to the classical engines.

The Tangential Combustion Turbine works similarly to a turbine by means of the action of the combustion power directly against the rotor, and has better efficiency. The Tangential Combustion Turbine needs only a fraction of a rotor's revolution for the entire cycle of an ignition, (intake, compression, ignition, and exhaust). Consequently, the engine is buildable with one or more ignitions per rotor/revolution.

It is also possible to have one or more rotors per power shaft, which varies the power for many different performance purposes. In comparison to other engines, the Tangential Combustion Turbine combustion process is improved and cleaner versus the classical engines through the injection of fresh air into the burning chambers during the combustion. It is also possible to implement a lean premixed and pre-vaporized (LPP) combustion process for reduced emission of nitrate oxides.

The high efficiency of the Tangential Combustion Turbine, the flexibility in regards to size and number of ignitions per rotation, the low manufacturing cost, and the high power per weight unit gives the Tangential Combustion Turbine a high amount flexibility regarding use in different areas. It may be used in the auto and motorcycle industry, power boats, flying and hovering machines, as well as for electric power generators. The engine is suitable for a variety of flying vehicles including ultra light air craft, as well as slow but heavy load flying machines. The rotor may be coupled to a propeller, flywheel, shaft, or an electric generator.

To assist the reader, the following is a list of parts of the present invention:

| No. | Description |
| --- | --- |
| 1 | Casing |
| 2 | Rotor |
| 3 | Power Shaft |
| 4 | Combustion Lever |
| 5 | Exhaust Lever |
| 6 | Ignition Chamber |
| 7 | Exhaust System |
| 8 | Peripheral Surface of Rotor |
| 9 | Stroke |
| 10 | Air Duct |
| 11 | Nozzles |
| 12 | Front Surface |
| 13 | Ignition Holder |
| 14 | Ball-Bearings |
| 15 | Radial Compressor |
| 16 | Seals |
| 17 | Pressurized Cavity |
| 18 | Fresh Air Channel |
| 19 | Fresh Air Slot |
| 20 | Target Surface |
| 21 | Springs |
| 22 | Opening |
| 23 | Lower End Surface |
| 24 | End Surface |
| 25 | Rebound Surface |
| 26 | Side Plates |
| 27 | Fresh Air Cover |
| 28 | Pressured Air Lid |
| 29 | Combustion Cam Inlet Surface |
| 30 | Clockwise Rotation |
| 31 | Lever Bolt |
| 32 | Ring Seal Lids |
| 33 | Rotor Surface |
| 34 | Gasket |
| 35 | Air Intake |

Figure 1:
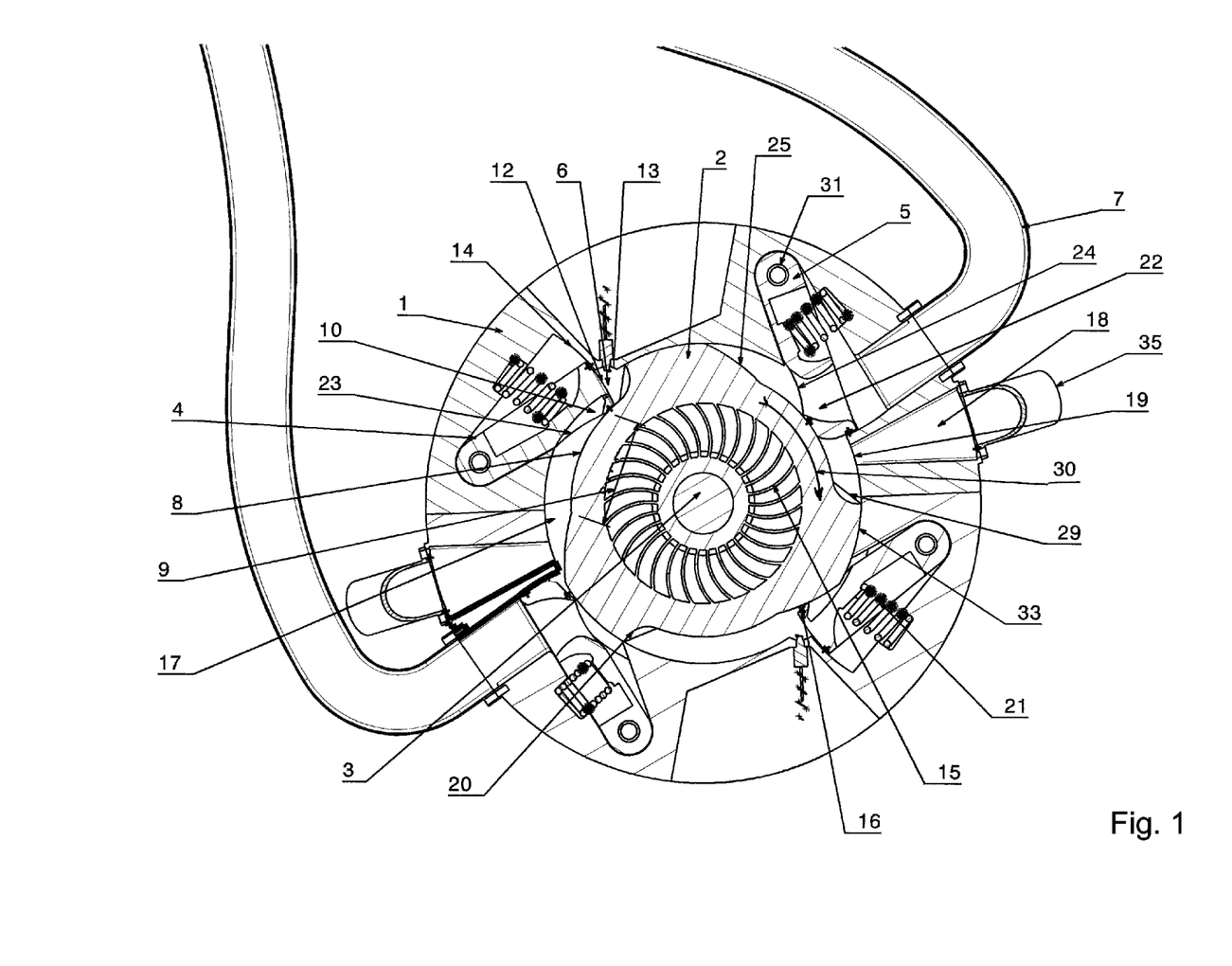
FIG. 1 is a cross section through the combustion chambers of the present invention and shows the power shaft in a cross section.
Figure 2:
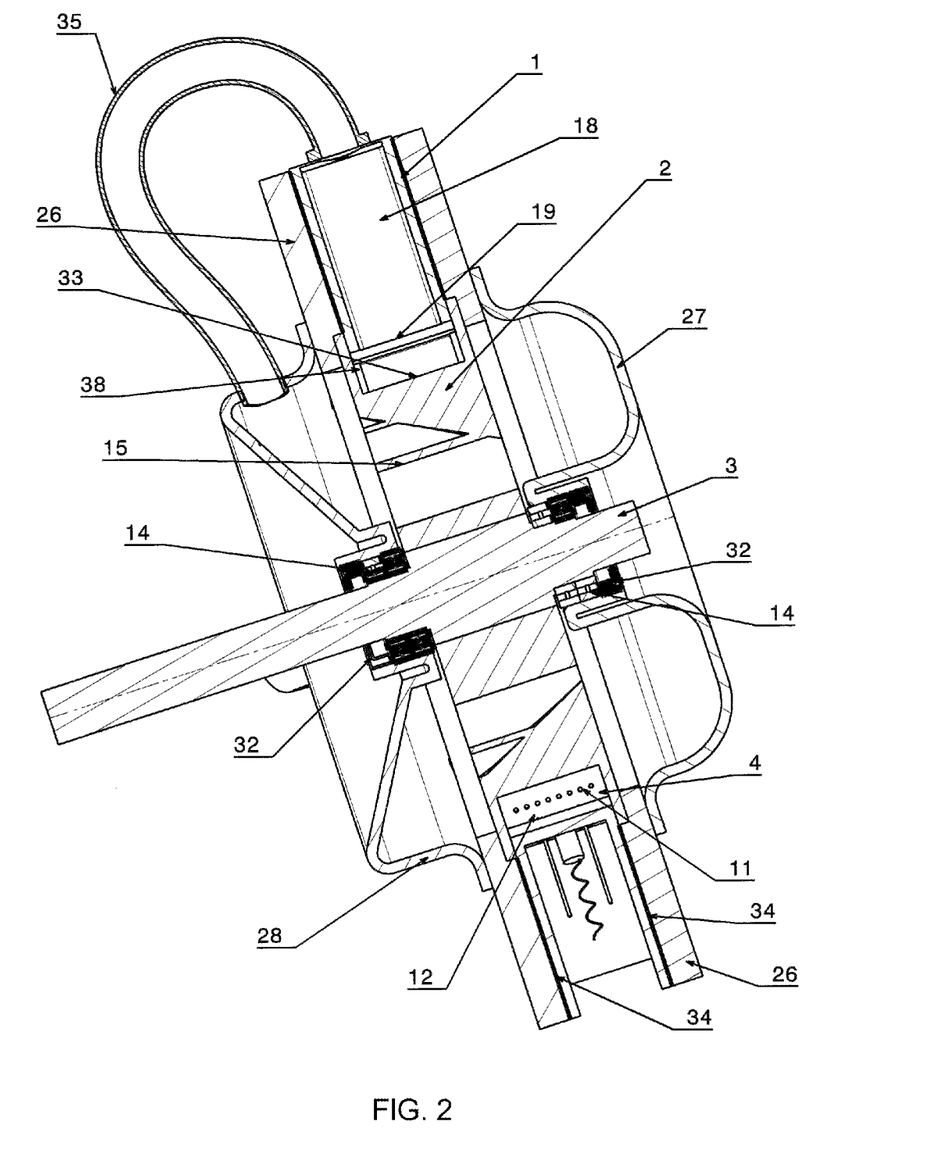
FIG. 2 is another cross section through the present invention, perpendicular to FIG. 1 and shows the power shaft in a side view.

FIG. 1 is a view that is a perpendicular cross section relative to the power shaft 3. The engine is built as an assembly of two symmetrical casing 1 halves. The tangential combustion turbine uses the expansion power released during the burning of an oxygen/combustible mixture to directly drive a rotor 2. Ignition chambers 6 are formed adjacent to a compression chamber 17 on the peripheral surface 8 of the rotor 2 and the interior surface of the casing 1 through the movement of a combustion lever 4 which is tracking the rotor 2 surface as it rotates. These ignition chambers are also enclosed on two sides by side plates 26 (as shown in FIG. 2). The combustion process will essentially implement the Otto or the Diesel principles in a unique fashion.

The compression chamber 17 is filled with pressurized fresh air for the case of injection engines, while passing the fresh air slots 19 or admission slots. (Alternately, the compression chamber is filled with pressurized fuel and air mixture for the case of a premix system.) The moving in of the combustion lever 4 can increase the pressure in these chambers, or just separates the two chamber parts, to define the ignition space or ignition chamber 6 on its front side surface. After the ignition, the combustion process will be further enhanced through the injection of fresh air from behind the moved in combustion lever through its air ducts 10 and nozzles 11 by the rotation of the rotor over the stroke 9. This pressurized injection of air into the ignition chamber will maintain the combustion for a certain time, similarly to the process of the gas turbines.

The Tangential combustion turbine is sealed toward the exterior by using a fresh air cover 27, a pressured air lid 28, as well as two side plates 26. This provides higher safety toward the release of gases into the atmosphere and therefore reduces the necessity of a 100% sealing of the combustion chambers.

Figure 6:
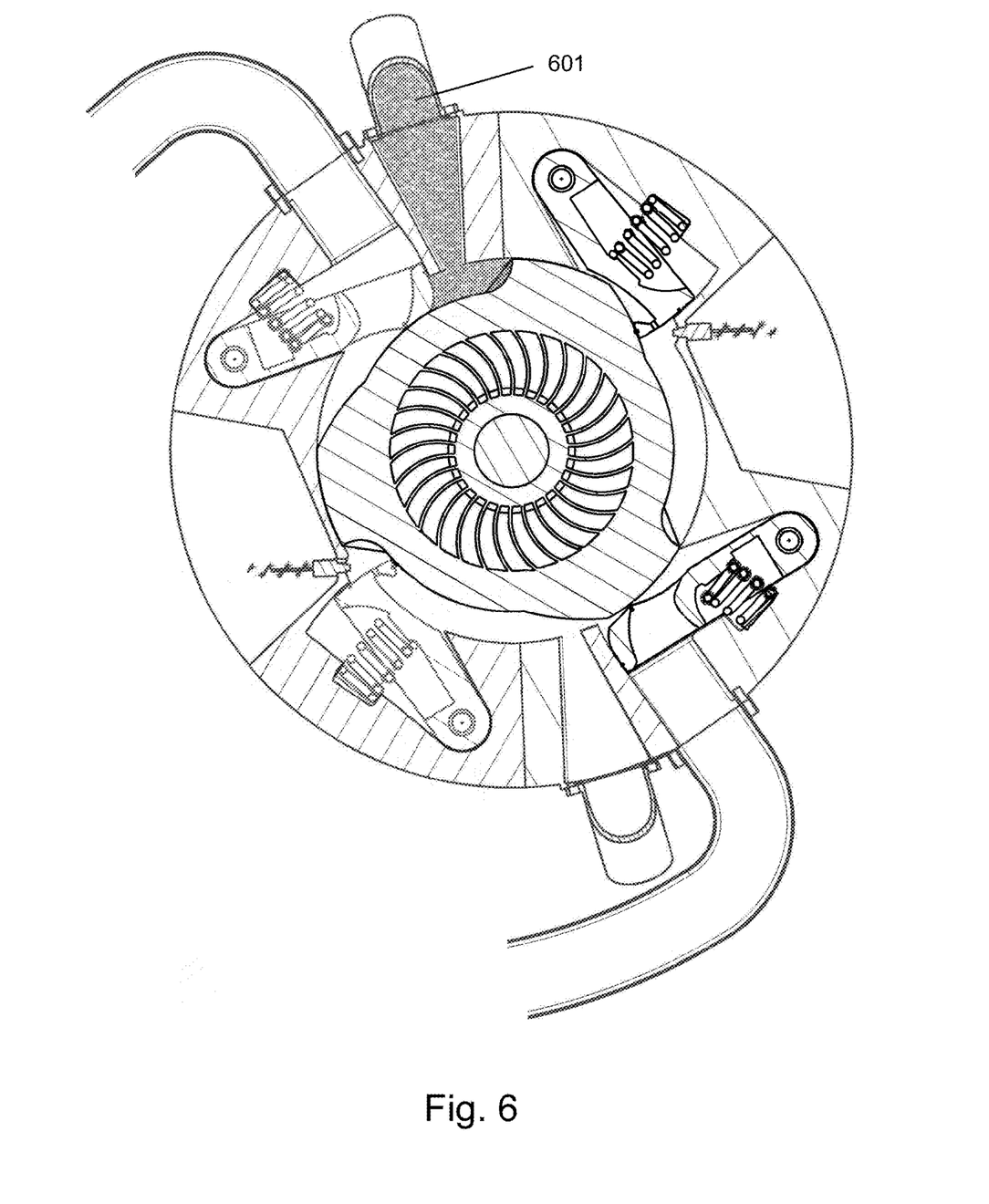
FIGS. 6-10 show an illustration of a combustion cycle of the present invention.
Figure 7A:
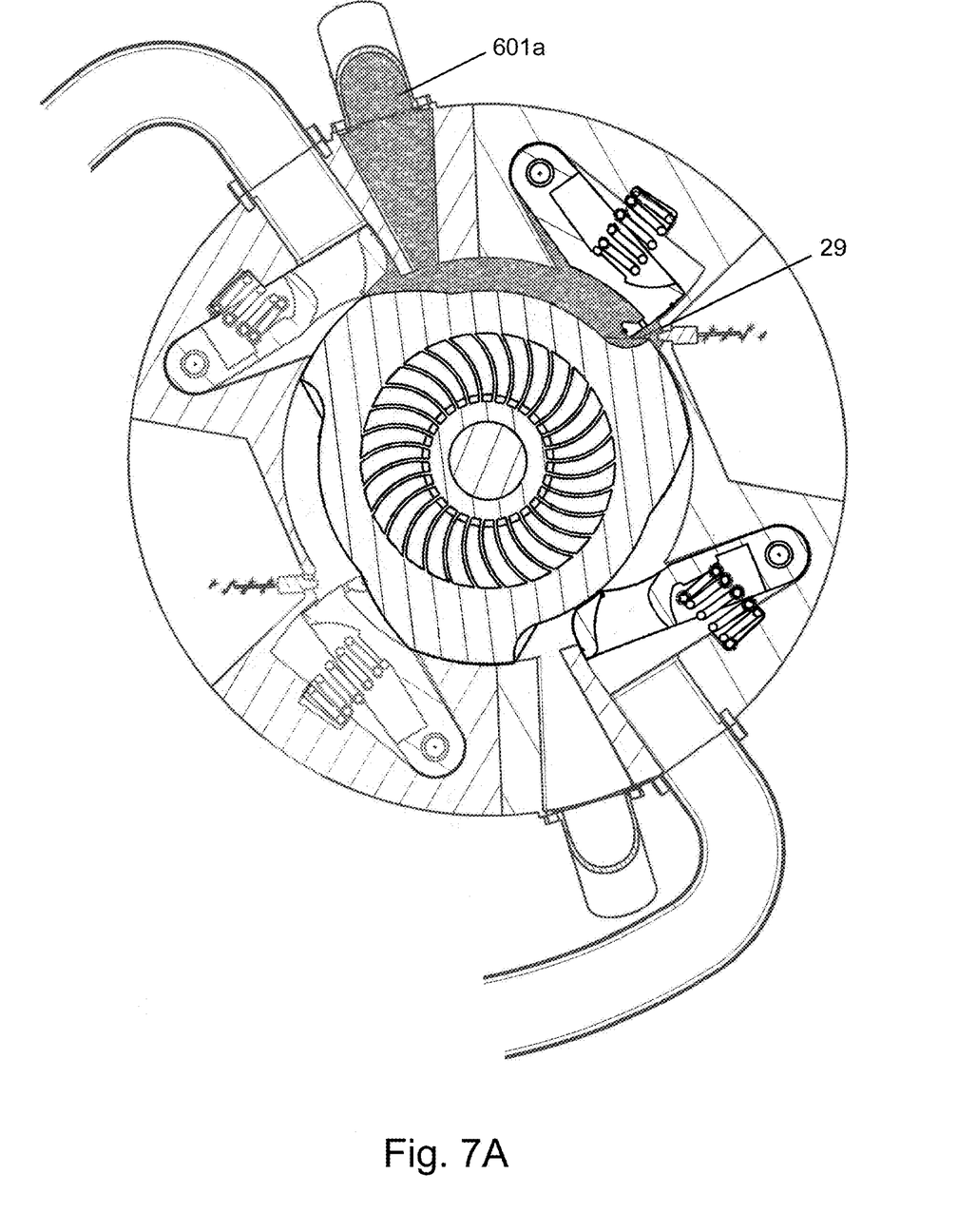
Figure 7B:
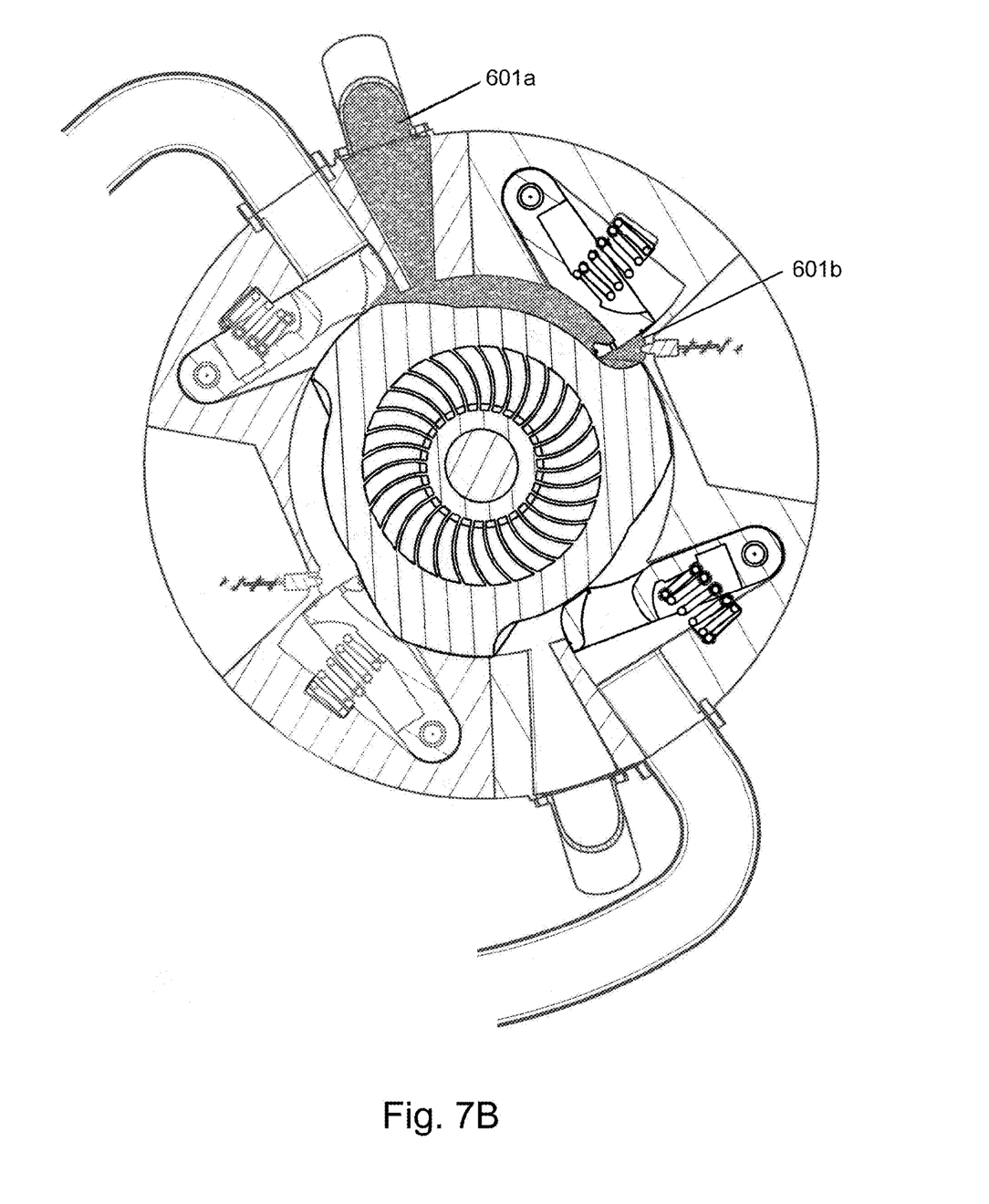

The combustion lever 4 allows air into the combustion chamber by the shoulder surface 29. This cam like surface is not machined across the width of the rotor and allows an initial charge of fresh air to pass underneath the combustion lever 4 into the ignition chamber. As shown in FIG. 6 the shoulder surface 29 is a straight line, but this surface could also be in the shape of a convex line, could be somewhat long, and is designed based on optimum engine performance parameters.

After combustion and expansion, the clockwise rotation 30 brings the combustion chamber to the exhaust lever 5 which advances into the chamber and eliminates the exhaust gases through its shape and opening 22 into the exhaust system 7. Immediately thereafter, the rotor lobe passes in front of the fresh air slot 19 to create another compression chamber for the next cycle.

The combustion levers and exhaust levers are continuously pressed by spiral springs 21 against the exterior rotor surfaces 33, 29, 8 of the rotor 2 and advanced into the chambers according to the position of the rotor 2. These levers are pushed again out of the chambers with the advance of the rebound surface 25 of the rotor 2. The Tangential Combustion Engine is designed for one, and for more than twelve ignitions per rotation for a single rotor, and more than one rotor is installable per engine on the same power shaft.

As a typical example shown in FIGS. 1 and 2, there are six ignitions per revolution, dual turbo charged fuel injection version, and one rotor. There are two combustion levers 4 and two exhaust levers 5, which are mounted within a ring like casing 1 with lever bolts 31 which permit rotation of the levers about the bolt. Two side plates 26, a fresh air cover 27 and a pressured air lid 28, assembled with bolts (not shown), make the stationary casing complete. The assembly of the casing 1 and the side plates is sealed by the gaskets 34. The rotor 2 rotates clockwise with three lobes which creates three pressurized cavities 17 and additionally includes a radial compressor 15. The power shaft 3 is attached to the rotor 2 and is mounted to the stationary casing with ball-bearings 14 sealed with the ring seal lids 32.

The combustion levers 4 and the exhaust levers 5 are mounted on the casing 1 using lever bolts 31 so that they can by pressed against the exterior rotor surface 33, 29, 25, 8 of the rotor 2 by coil springs 21. The rotor surface 33 represents the top of the rotor lobe's peripheral surface, which can be also u-shaped.

The rotor 2 hosts three pressurized cavities 17 between the rotor lobes. The pressurized cavities 17 each will create an ignition chamber 6 adjacent to their front end rotation clockwise 30.

The radial compressor 15 shown within the rotor 2 provides the last compression step for the fresh air delivered into the pressurized cavity 17 via the air intake 35 to the fresh air channel 18, and through the admission fresh air slots 19. With rotation, the pressurized cavity 17 or chamber will reach the admission fresh air slots 19 to be filled with compressed air. The timing and the duration of the fresh air access can be determined for specific motor parameters, as for its rotation speed and delivered fresh air pressure, by positioning the admission slots and defining their size accordingly. The moment the front section of the pressurized cavity 17 reaches the front section of the combustion lever 4, the combustion lever is pressed by the spring 21 into the cavity by following the sliding curve. This allows the air from the pressurized cavity 17 to be further compressed and be pushed into the area beyond the front surface 12 of the combustion lever 4 into the ignition chamber 6 which includes the ignition holder 13 of the casing in the ignition volume. The fuel injection and the ignition are provided as well within the ignition holder 13.

The pressure generated by the combustion process acts against the front surface 12 of the combustion lever 4, which generates a force against the lever bolt 31, and through this against the stationary casing 1. The combustion process also generates pressure against the target surfaces 20, 29 of the rotor 2 rotating it clockwise 30. Torque is generated through the direct and tangential action of the combustion forces against the engine's rotor. The side pressures of the combustion forces are contained by the sidewall plates 26.

As another embodiment, the fuel and ignition ducting can be installed within the combustion lever 4 and brought to its front surface 12 into the ignition chamber 6, to benefit the combustion process.

In order to ensure the combustion lever 4 is not pushed up from the ignition position, the front surface 12, the shape, and the assembly position of the lever bolt 31 are geometrically designed to withstand the generation of the forces generated during the combustion processes. A suitable design also reduces the size of the springs 21. The front surface 12 of the combustion lever 4 can be shaped concave, convex or in any other form and shape to optimize the turbulence for the combustion process.

The pressurized cavities 17 are elongated by the rotation of the rotor 2, and create a type of 'stroke' 9 in order to provide room for additional fresh air for the combustion. The fresh air injected into the compression chamber 17, behind the combustion lever being advanced into the ignition position, is forced into the compression chamber 17 through the rotation of the rotor 2. As the rotor 2 rotates, the compression chamber 17 reduces in size and injects air into the ignition chamber 6 through the air duct 10 and nozzles 11 of the combustion lever. The additional fresh air jetted into the combustion process provides an important extension of the combustion process, depending upon the design of the rotor. The amount of air that is additionally injected through the air duct and nozzles may be the majority of air used in the combustion process, as much as 75%, depending upon the rotor design.

The proposed engine offers the advantage of a number of parameters which can be adjusted in order to optimize the combustion process, as the pressure of the fresh air, the size and shape of the combustion chambers and of the combustion lever and air nozzles, quantity and duration of the injection, and the number of rotor lobes, etc.

The combustion areas of the engine are sealed by seals 16 installed on the combustion levers and exhaust levers, which seal against their adjacent volumes. Seals are known in the art.

After completed combustion, the exhaust filled pressurized cavity 17 rotating clock wise, reaches the exhaust lever 5 which is pushed by the spring 21 into the approaching cavity, and through its shape and the opening 22 sends the exhaust gases into the exhaust system 7 for elimination.

The rebound surface 25 of the pressurized cavity 17 is designed to smoothly interact with the lower-end surfaces 23 and 24 of the combustion and exhaust levers, to perform their smooth ejection from the cavities.

The pressurized cavity 17 reaches the fresh air slot 19 the moment the target surface 20 has passed the exhaust lever 5, to be filled again with pressurized fresh air for the next cycle.

For better performance, a rather wide than narrow design of the pressurized cavities and the levers, with rectangular or elliptic shape of the section, thus wider than higher, is preferred in order to reduce the stroke of the levers as a source for possible vibrations and noise, increase the capacity and reduce the overall size of the engine.

The fresh air cover 27 and the pressured air lid 28 as well as the form and size of the radial compressor 15 can be designed accordingly, to use the fresh air for the cooling of the sealed interior part of the engine.

Depending on the size and number of rotors of the engine, the rotor can be designed to act as a flywheel as well, in order to annihilate possible vibrations caused by air mass flow differentials through the combustion lever nozzles 11 at certain critical rotation speeds if any.

Figure 3:
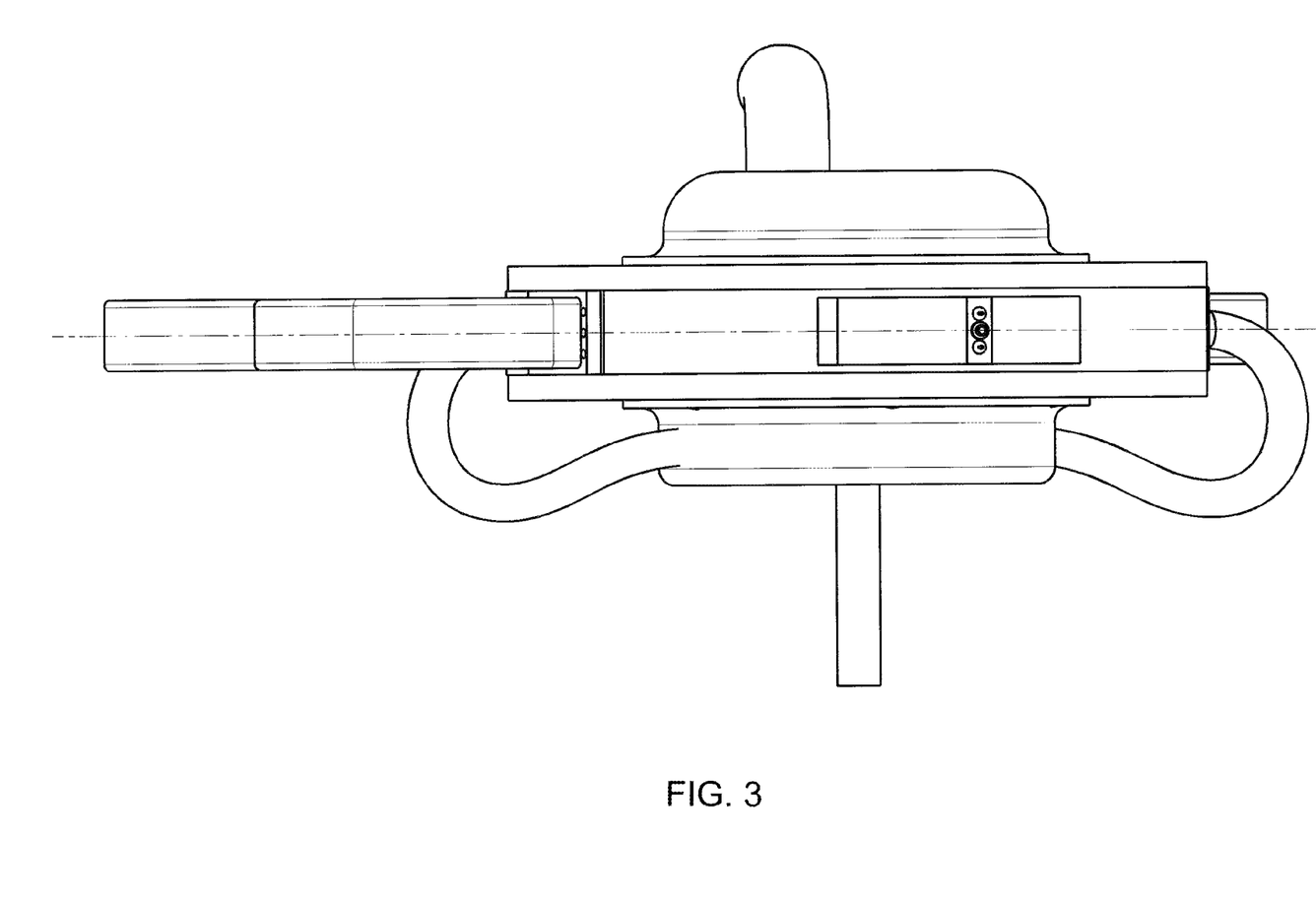
FIG. 3 shows a bottom view that is not a cross section.

FIG. 3 shows a bottom view of the present invention with the casing covers assembled.

Figure 4:
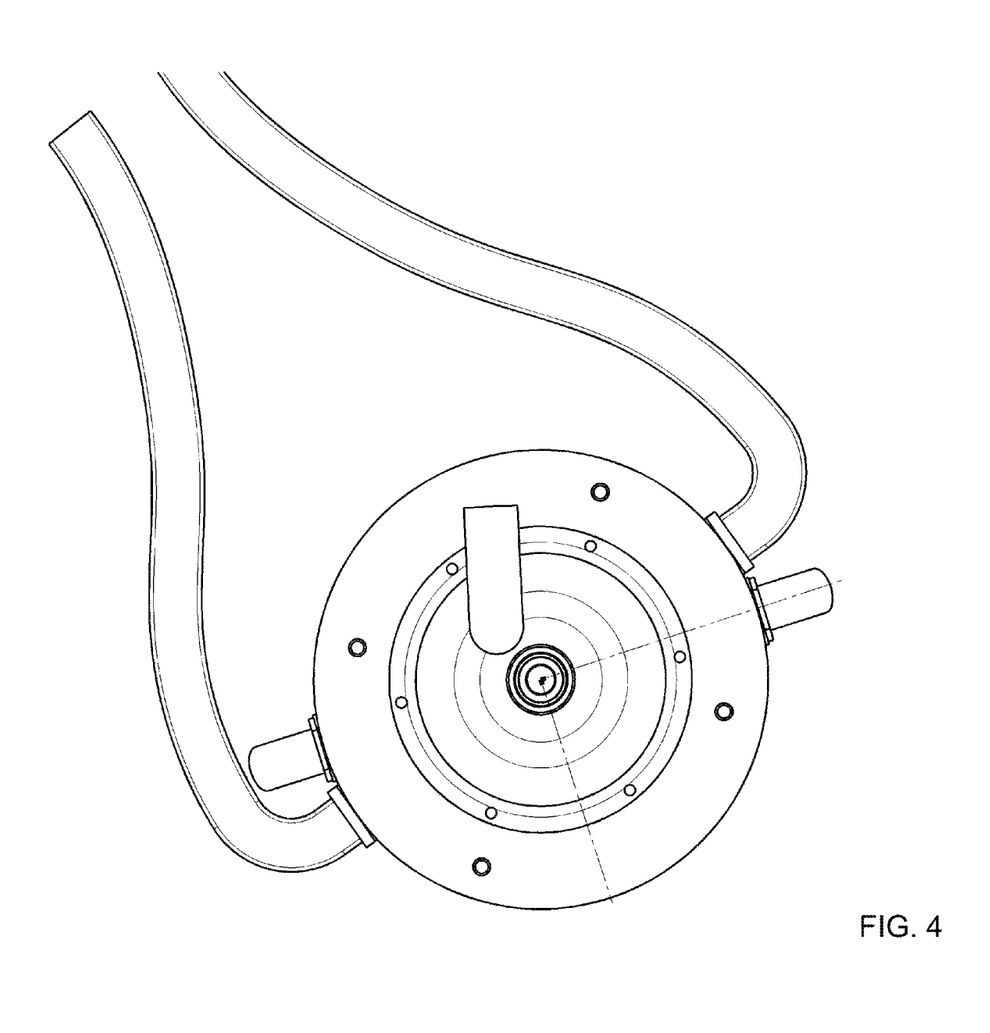
FIG. 4 a front view that is not a cross section.

FIG. 4 shows a front view of the present invention with the casing cover and air intake pipe, as well as the longer exhaust piping.

Figure 5:
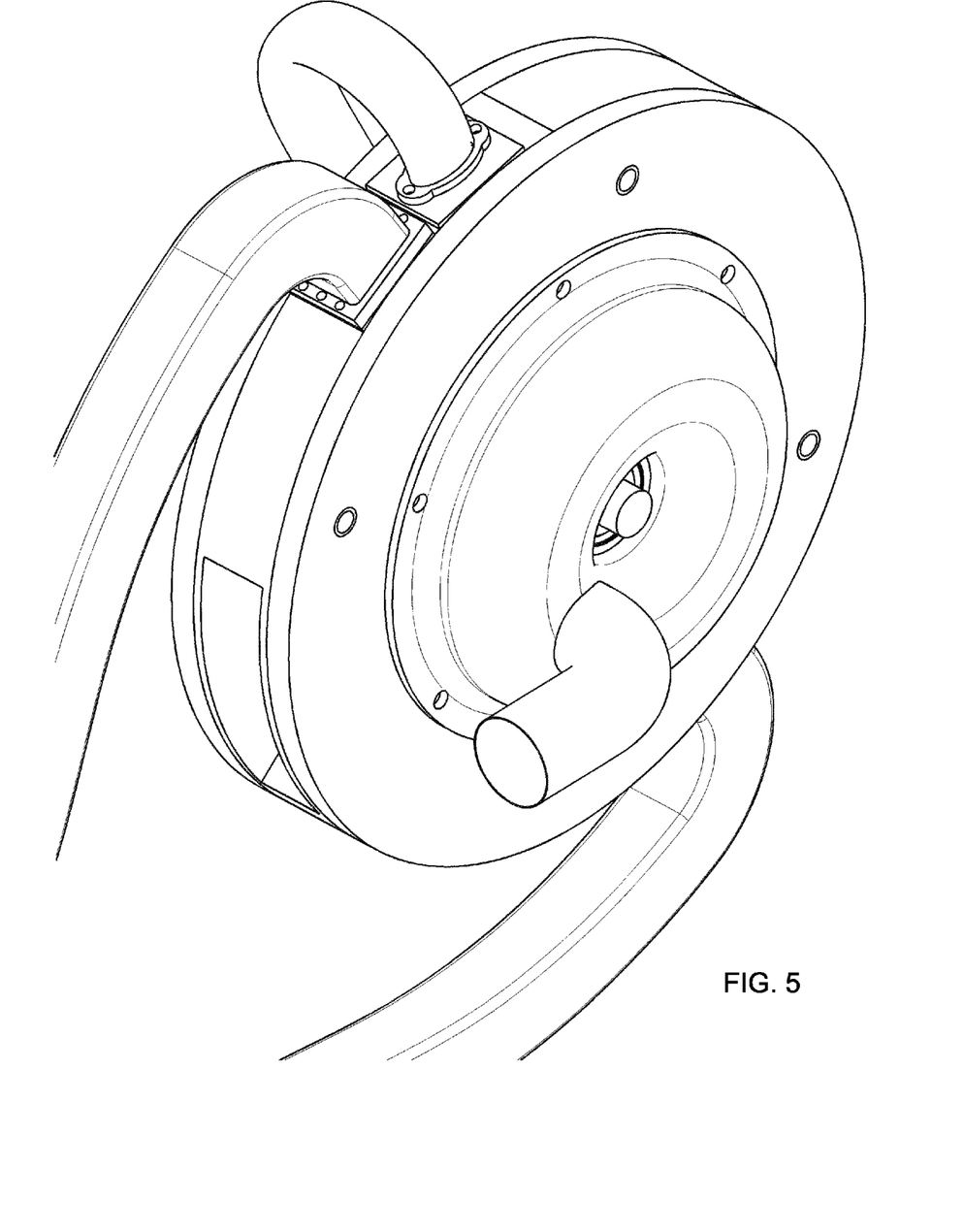
FIG. 5 is an isometric view that is not a cross section.

FIG. 5 shows an isometric view of the present invention with the casing cover, air intake pipe, and exhaust piping.

Figure 8:
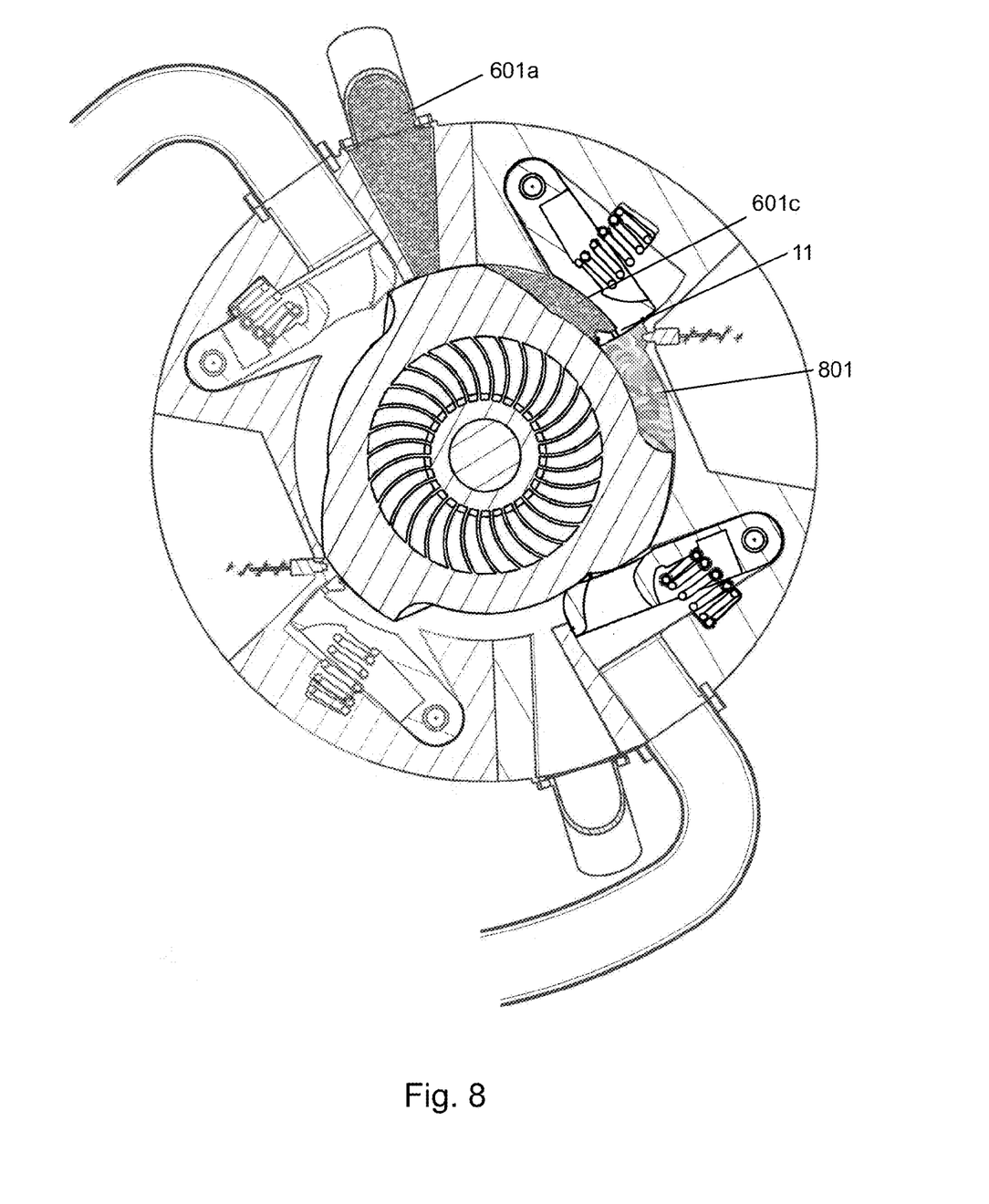
Figure 9:
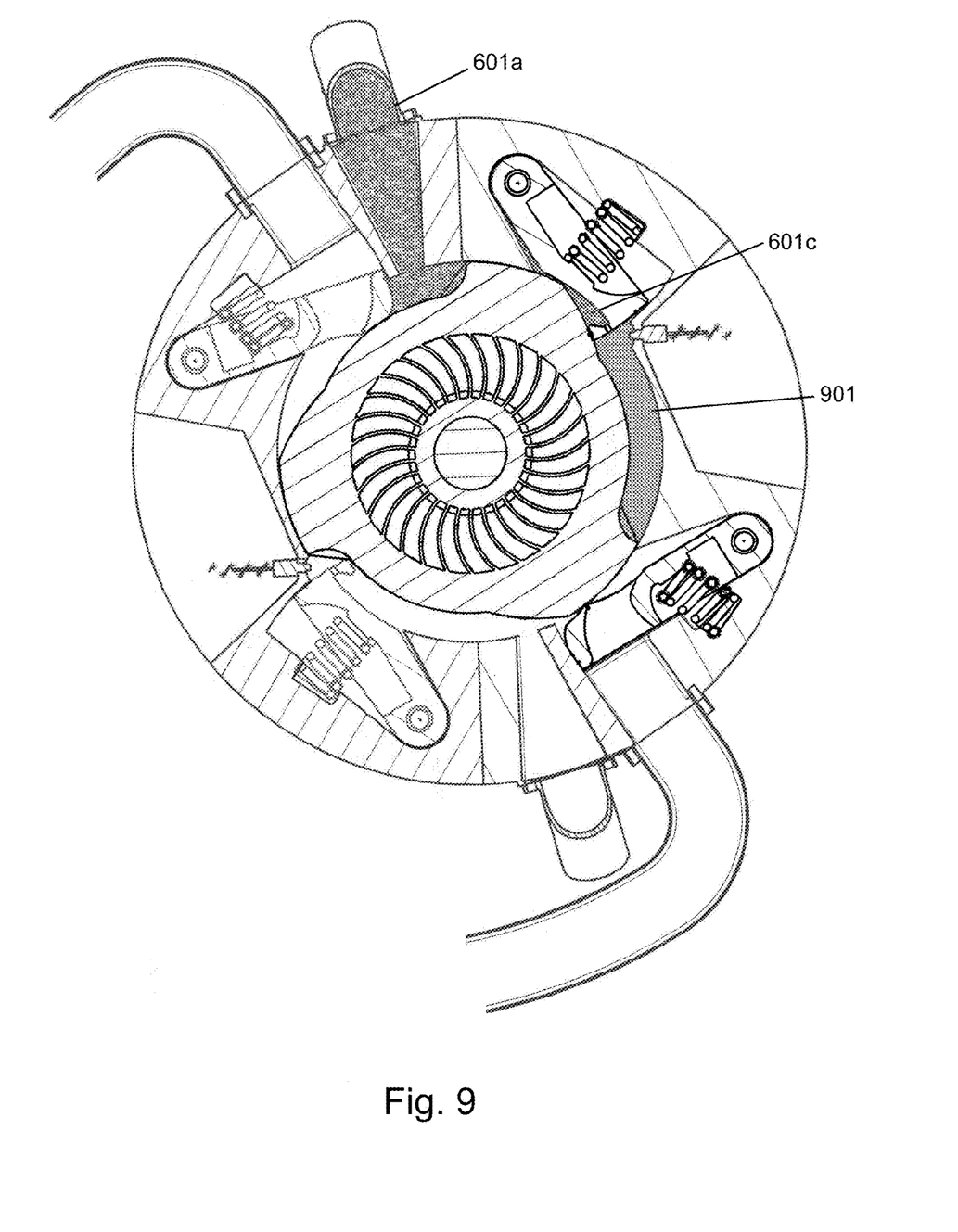
Figure 10:
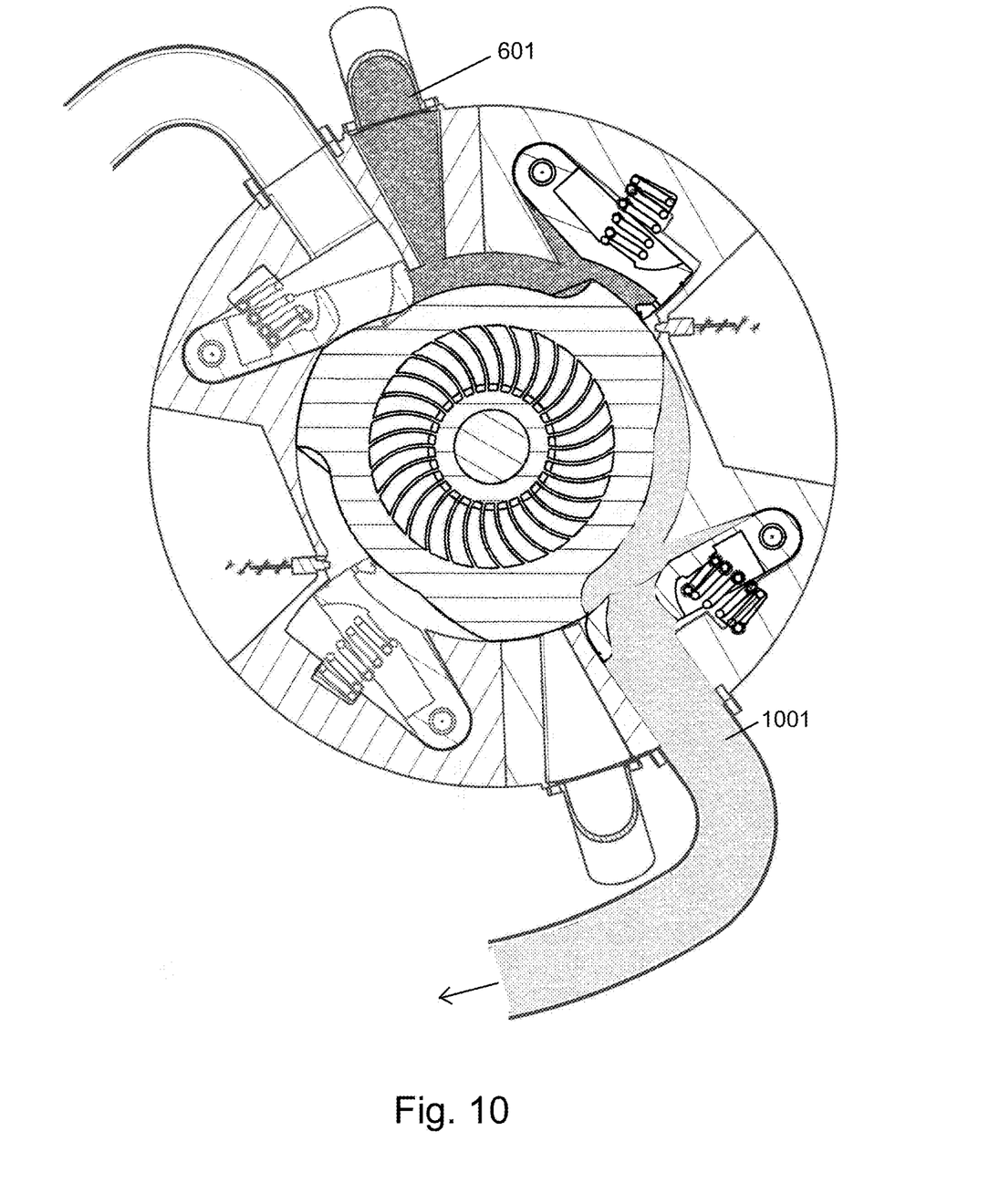

FIGS. 6-10 additionally illustrate one cycle of the present invention. Air flow through the left cycle is not illustrated for the sake of clarity. FIG. 6 shows combustion air 601 being injected into a compression chamber as previously discussed. The combustion air 601 has been created by the radial compressor that is driven by the rotor. FIG. 7A shows the rotor advancing by rotating clockwise and the combustion and exhaust levers rotating to maintain contact with the rotor surface due to the pressure of the springs. A small amount of compressed air enters the ignition chamber due to the cam surface 29 raising the combustion lever and allowing air to flow into the ignition chamber. FIG. 7B shows the rotor slightly more advanced where the combustion lever is at its lowest position. Combustion air 601b is now in the ignition chamber and combustion air 601a is also in the compression chamber. FIG. 8 shows the rotor advanced after the combustion process has been initiated by a spark or other ignition causing action, such as a fuel injection. The combustion gases are expanding and additional air is being injected into the ignition chamber through the nozzles 11 in the combustion lever. Combustion air will now only flow between the compression chamber and ignition chamber through the nozzles in the combustion lever. This will take place due to the advancing lobe of the rotating rotor which will additionally compress the combustion air 601c upstream of the nozzles. FIG. 9 shows the rotor advancing due to the expanding gases to where the rotor is just about to allow the exhaust gases to reach the location where the exhaust lever will expel the exhaust gases 901 into the exhaust piping system. Only a relatively small amount of compressed air 601$c$ remains in the pressurized cavity. FIG. 10 shows the exhaust gases 1001 being expelled into the exhaust piping and new compressed air 601 entering the compression chamber for the next cycle.

Figure 11:
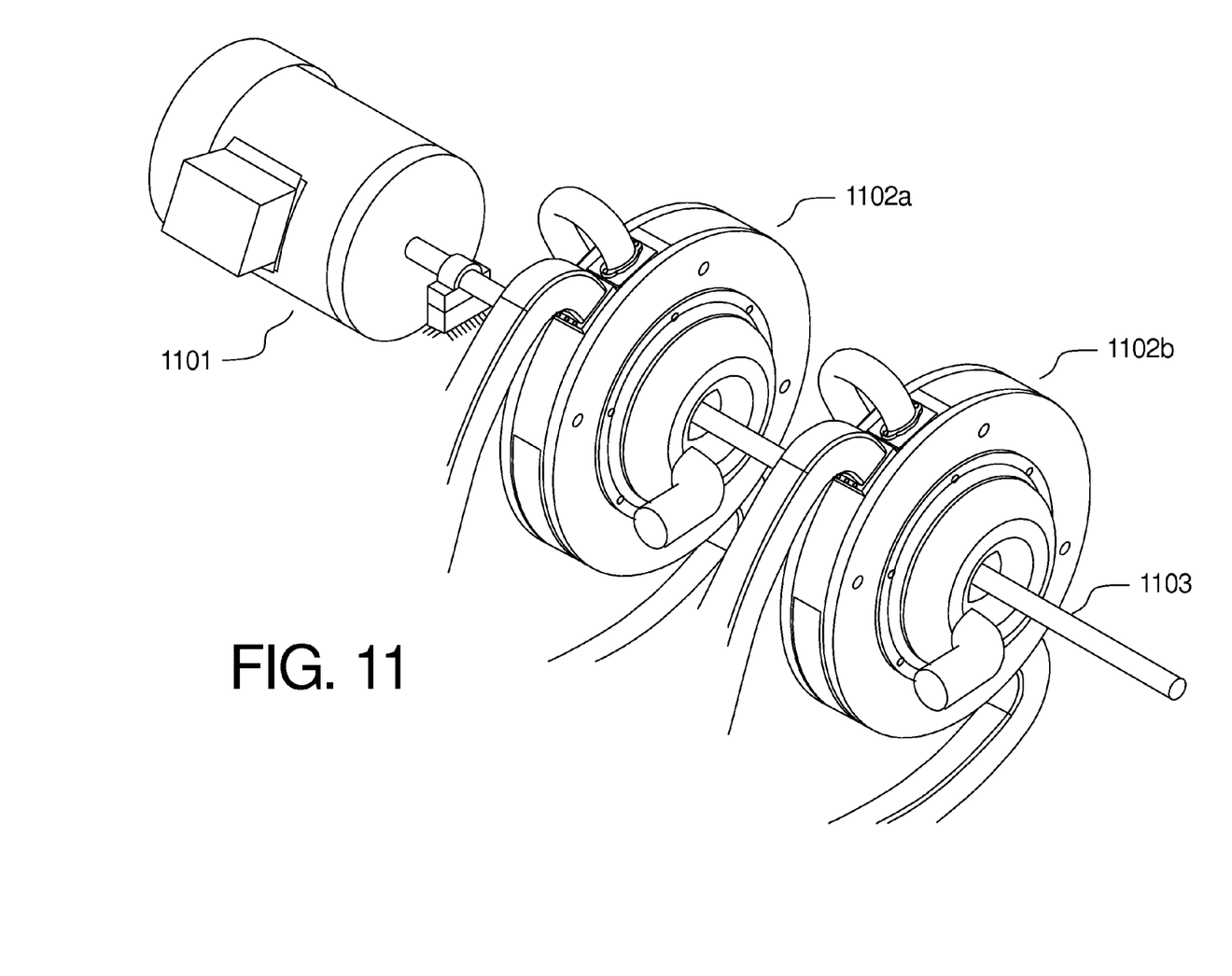
FIG. 11 shows an illustration of two tangential combustion engines on a single shaft.

FIG. 11 shows an embodiment where two tangential combustion engines 1102$a,b$ are on a single power shaft 1103, which in turn, are connected to an electric generator 1101.

A further advantage of this engine is the fact that compared with the classical engines it has only a few rotating/moving parts. For example, the illustrated tangential combustion turbine designed for six ignitions per rotation will have only five moving power generating parts, while an equivalent Diesel/Otto has twelve cylinders and therefore twenty five moving parts.

Performance Estimates. A comparison is made to a piston engine built by a manufacturer for small airplanes. The table is for one design, and other designs are otherwise described.

| Comparison Table | Small Airplane Engine - Rotax | Tangential Combustion Turbine | Ratio |
| --- | --- | --- | --- |
| Type | 4 Cylinder, 4 Stroke | Rotary, 3 Chamber, 2 Ignition Sources | — |
| Ignitions per Revolution | 2 | 6 | 3 |
| Capacity | 1.211 liter | 0.75 liter | 0.62 |
| Method of Charging | Exhaust Turbo | Mechanical Turbo | — |
| Max Engine Speed | 5,800 rpm | 5,000 rpm | 0.86 |
| Power at Max RPM | 100 Hp | 220 Hp | 2.2 |
| Max. Torque | 144 Nm | 200 Nm (minimum) | 1.4+ |
| Total Weight | 82.5 Kg | 47 Kg | 0.57 |
| Performance - Hp/Kg | 1.27 Hp/Kg | 5.53 Hp/Kg | 4.35 |
| Max Fuel Consumption | 27 liters/hr | 52 liters/hr | 1.92 |

In another embodiment of the present invention, the stationary casing and the rotor can be designed in a way so that the stationary casing is on the interior, and the rotor is on the exterior, with the rotor rotating around the interior casing, according to the purpose and size of the desired engine.

In a main embodiment of the present invention, the exhaust levers and combustion levers are pressed against the surface of the rotor by springs. In other embodiments, they are pressed by other methods in single or in combination, such as hydraulic lifters, rubber cushions, electromechanical actuators, air actuators, springs, or cams. The position of the combustion lever, may be chosen so as to facilitate a smaller "hold down" force against the rotor to avoid its dislocation by the combustion forces in the combustion chamber, and to permit the use of smaller springs or weaker hold down forces.

In another embodiment, the amount of air admitted into the pressure chamber is controlled by the fresh air slots 19, and the timing, duration, and mass volume of air admission are managed by the dimensioning of the fresh air slots 19 and their number. Additionally, a valve may be added to the air intake system to provide further combustion air management.

In another design embodiment, the nozzles 11 located on the combustion lever are flashback protected against the combustion of fuel and air mixture, as well as against any shock wave generated by the combustion of fuel and air mixture.

In another design embodiment, the combustion lever has a cooling system design built in. Within its front part, under its surface, air channels may be designed to allow combustion air to pass through and be released into the combustion chamber which will also provide for cooling of the lever. Both the combustion and exhaust levers may be also cooled by cooling air or cooling liquid means circulated through cooling canals which may be included in their overall design.

In another embodiment, the combustion levers and exhaust levers are mounted into the casing in alternate methods, such as bolted, gliding, lever systems. They may follow different advancing movements into the pressurized cavities using specific motions. The exhaust and combustion levers may be similarly designed or be completely different. The exhaust and combustion levers may be formed out of one piece or may be a combination of pieces.

In another embodiment, the combustion air may be compressed prior to reaching the radial compressor, such as by a first turbo charger. The turbo charger may be driven by the rotor or by the power shaft 3 through suitable gearing if desired or necessary.

In a design embodiment, the turbine is sealed by covering lids on both sides which provides a distinct pathway for air and exhaust flows. This avoids the escape of unburned fuel gases into the atmosphere, so that all fuel will have to be returned to the combustion chambers to exit the engine via the combustion and exhaust system.

In another design embodiment, the combustion air is heated by the radial compressor which is powered by the rotor. The radial compressor may be directly driven by the rotor or be driven by the power shaft through optional gearing. The combustion air may provide important cooling to the internal parts of the rotary combustion turbine and in the process receive heat input which will improve turbine efficiency.

In another design embodiment, the exhaust lever springs are mechanically protected from being touched by the exhaust stream. This may be done through ducting systems.

In another design embodiment, the casing may be cooled by air, cooling liquids, or a combination of cooling elements.

In another design embodiment, the tangential radial turbine is switchable between using a premix air fuel mixture and directly injecting fuel into the combustion chamber according to the power demand upon the engine, or based on the exhaust cleanliness requirements of the engine, or both.

In another design embodiment, a swirl provider is used for admitted air into the combustion chamber.

In another design embodiment, the combustion levers are maintained in the "off the chamber" position by mechanical, electro mechanical, or other means during the starting process until the starting rotation speed has been reached, and are then released for their working process only with the first ignition, in order to facilitate starting or initial operation.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

We claim:

1. A tangential rotary combustion turbine comprising:
   a) a rotor within a casing, wherein said rotor rotates relative to said casing,
   b) wherein said rotor has a plurality of lobes,
   c) at least one combustion cycle per rotation of said rotor, wherein said combustion cycle comprises:
      aa) one combustion lever mounted on said casing,
      bb) one exhaust lever mounted on said casing,
      cc) a first lobe and a second lobe,
      dd) an ignition chamber that is created by the geometry of:
         i) said first lobe, ii) said casing, and
iii) said combustion lever,
ee) a compression chamber that is created by the geometry of:
i) said second lobe,
ii) said casing, and
iii) said combustion lever,
ff) wherein said combustion lever admits an initial quantity of air from said compression chamber to said ignition chamber by following a curve on said rotor,
gg) wherein a combustible mixture of fuel and air is used to release energy within said ignition chamber according to a predetermined criterion,
hh) wherein said released energy acts upon said rotor and causes said rotor to rotate,
ii) wherein the rotation of said rotor causes additional compression of air in said compression chamber,
jj) wherein the rotation of said rotor causes an additional quantity of air to be injected from said compression chamber into said ignition chamber through nozzles in said combustion lever over a stroke, wherein said additional quantity of air is used for the purpose of additionally releasing energy,
kk) wherein any released energy additionally acts upon said rotor for power output.

2. The tangential rotary combustion turbine according to claim 1 wherein said combustion lever is used to admit: mixtures of said fuel and said air into said ignition chamber, and said combustion lever is pressed against said rotor by pressing means.

3. The tangential rotary combustion turbine according to claim 2 wherein said second lobe compresses mixtures of said fuel and said air for use in said ignition chamber.

4. The tangential rotary combustion turbine according to claim 1 wherein said exhaust lever is used to relieve exhaust gases from burning of said combustible mixtures of said fuel and said air from said ignition chamber, and said associated exhaust lever is pressed against said rotor by pressing means.

5. The tangential rotary combustion turbine according to claim 1 wherein said air is first compressed by a radial compressor which is driven by said rotor.

6. The tangential rotary combustion turbine according to claim 1 wherein the amount of said air admitted into said compression chamber is controlled by at least one air slot, and the amount of said air admitted into said compression chamber is controlled by the design of said at least one air slot.

7. The method of providing power by use of a tangential rotary combustion turbine comprising:
a) providing a rotor within a casing, wherein said rotor rotates relative to said casing, wherein said rotor has a plurality of lobes,
b) providing features for at least one combustion cycle per rotation of said rotor, wherein said features for said at least one combustion cycle comprises:
aa) one combustion lever mounted on said casing,
bb) one exhaust lever mounted on said casing,
cc) a first lobe and a second lobe,
dd) an ignition chamber that is created by the geometry of:
i) said first lobe,
ii) said casing, and
iii) said combustion lever,
ee) a compression chamber that is created by the geometry of:
i) said second lobe,
ii) said casing, and
iii) said combustion lever,
ff) a curve on said rotor,
gg) nozzles on said combustion lever,
c) providing for at least one combustion cycle per rotation of said rotor, wherein said combustion cycle comprises:
aa) wherein said combustion lever admits an initial quantity of air from said compression chamber to said ignition chamber by following said curve on said rotor,
bb) wherein a combustible mixture of fuel and air is used to release energy within said ignition chamber according to a predetermined criterion,
cc) wherein said released energy acts upon said rotor and causes said rotor to rotate,
dd) wherein the rotation of said rotor causes additional compression of air in said compression chamber,
ee) wherein the rotation of said rotor causes an additional quantity of air to be injected from said compression chamber into said ignition chamber through said nozzles in said combustion lever over a stroke, wherein said additional quantity of air is used for the purpose of additionally releasing energy, and
d) obtaining power output by:
aa) wherein any released energy additionally acts upon said rotor for power output.

* * * * *